(12) United States Patent
Taniguchi et al.

(10) Patent No.: US 9,255,350 B2
(45) Date of Patent: Feb. 9, 2016

(54) BRANCHED POLY(ARYLENE SULFIDE) RESIN AND METHOD FOR PRODUCING SAME

(75) Inventors: Shingo Taniguchi, Tokyo (JP); Hiroshi Sakabe, Tokyo (JP); Yui Yoshida, Tokyo (JP); Kazuhiko Sunagawa, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 437 days.

(21) Appl. No.: 13/638,227

(22) PCT Filed: Mar. 22, 2011

(86) PCT No.: PCT/JP2011/056762
§ 371 (c)(1),
(2), (4) Date: Sep. 28, 2012

(87) PCT Pub. No.: WO2011/125480
PCT Pub. Date: Oct. 13, 2011

(65) Prior Publication Data
US 2013/0022808 A1 Jan. 24, 2013

(30) Foreign Application Priority Data
Mar. 31, 2010 (JP) ................................. 2010-082725

(51) Int. Cl.
| | | |
|---|---|---|
| C08G 75/16 | (2006.01) | |
| C08G 75/14 | (2006.01) | |
| D01F 6/76 | (2006.01) | |
| C08G 75/02 | (2006.01) | |
| C08G 75/00 | (2006.01) | |
| B01D 46/00 | (2006.01) | |
| D04H 1/42 | (2012.01) | |
| D04H 3/00 | (2012.01) | |

(52) U.S. Cl.
CPC ............ *D01F 6/765* (2013.01); *C08G 75/0231* (2013.01); *C08G 75/0281* (2013.01); *Y10T 428/249921* (2015.04)

(58) Field of Classification Search
CPC ....................................................... C08G 75/02
USPC ............................ 528/381, 388, 387; 428/221
See application file for complete search history.

(56) References Cited

U.S. PATENT DOCUMENTS

| | | |
|---|---|---|
| 4,116,947 A | 9/1978 | Edmonds, Jr. et al. |
| 4,740,569 A | 4/1988 | Tieszen et al. |
| 5,093,469 A | 3/1992 | Senga |
| 5,200,500 A | 4/1993 | Iizuka et al. |
| 5,266,680 A | 11/1993 | Reed |
| 5,268,451 A | 12/1993 | Iizuka et al. |
| 7,060,785 B2 | 6/2006 | Hayashi et al. |
| 2005/0215759 A1 | 9/2005 | Matsuzaki et al. |
| 2006/0025632 A1 | 2/2006 | Hayashi et al. |
| 2007/0093642 A1 | 4/2007 | Sato et al. |
| 2007/0161777 A1 | 7/2007 | Sato et al. |
| 2008/0004375 A1 | 1/2008 | Kondo et al. |
| 2010/0113739 A1 | 5/2010 | Sato et al. |
| 2010/0234559 A1 | 9/2010 | Sato et al. |
| 2011/0124825 A1 | 5/2011 | Konno et al. |

FOREIGN PATENT DOCUMENTS

| | | |
|---|---|---|
| CN | 1668674 A | 9/2005 |
| CN | 101084274 A | 9/2005 |
| EP | 1837359 A1 | 9/2007 |
| JP | 01-299826 A | 4/1989 |
| JP | 03-074433 A | 3/1991 |
| JP | 07-330903 A | 12/1995 |
| JP | 63-315655 A | 12/1998 |
| JP | 11-171998 A | 6/1999 |
| JP | 2000-281786 A | 10/2000 |
| JP | 2005-194312 A | 7/2005 |
| JP | 2005-225931 A | 8/2005 |
| JP | 2009-270219 A | 11/2009 |
| JP | 2009-270230 A | 11/2009 |
| WO | WO 03/095527 A1 | 11/2003 |
| WO | 2006/068159 A1 | 6/2006 |
| WO | 2010/010760 A1 | 1/2010 |

OTHER PUBLICATIONS

Official Action from corresponding Chinese Application No. 201180017367.9, dated Jul. 1, 2014.
Official Action from corresponding Chinese Application No. 201180017367.9, dated Mar. 11, 2014.
Notice that the Japan Patent Office has received an Information Disclosure Statement by a third party issued to Japanese Application No. 2012-509397, mailed Mar. 24, 2015, with English language translation.
Japanese Office Action, dated Jul. 14, 2015, for Application No. 2012-509397, with an English translation.

*Primary Examiner* — Duc Truong
(74) *Attorney, Agent, or Firm* — Birch, Stewart, Kolasch & Birch, LLP

(57) ABSTRACT

Disclosed are a branched poly(arylene sulfide) resin having a melt viscosity measured at a temperature of 310° C. and a shear rate of 1200 sec$^{-1}$ of 65 to 450 Pa·s, a maximum draft ratio of 6500 or more, and a degree of whiteness of 65 or more; moreover, a branched poly(arylene sulfide) resin preferably having a dependence of melt viscosity on shear rate of 1.4 to 2.6 or a melt stability of 0.85 to 1.30; and a method for producing a branched poly(arylene sulfide) resin, wherein a sulfur source and a dihaloaromatic compound are caused to undergo a polymerization reaction at a temperature of 170 to 290° C. in the organic amide solvent in the presence of a polyhaloaromatic compound in an amount of 0.0001 to 0.01 mol per mol of the fed sulfur source.

11 Claims, No Drawings

BRANCHED POLY(ARYLENE SULFIDE) RESIN AND METHOD FOR PRODUCING SAME

RELATED APPLICATION

The present application is a 371 of PCT/JP2011/056762 filed Mar. 22, 2011.

TECHNICAL FIELD

The present invention relates to a branched poly(arylene sulfide) resin, a method for the production thereof, and a fiber made of the resin. Particularly, it relates to a branched poly (arylene sulfide) resin that is suitable for applications such as bag filters for high temperature, electric insulating materials, dryer canvas, and heat insulating materials and has improved operativity and productivity in spinning and stretching steps, a method for the production thereof, and a melt-molded article and a fiber made of the resin.

BACKGROUND ART

Poly(arylene sulfide) (hereinafter sometimes abbreviated as "PAS") resins including polyphenylene sulfide (hereinafter sometimes abbreviated as "PPS") resin are resins superior in functional balance of heat resistance, chemical resistance, flame retardancy, mechanical strength, electrical properties such as insulation property, dimensional stability, and the like. The PAS resins have been commonly used as resin materials in a wide variety of fields such as electrical and electronic instruments, automotive instruments and chemical instruments because they can be molded or formed into various kinds of molded products, films, sheets, fibers, etc., by general melt processing processes such as injection molding, extrusion, and compression molding. Since the PAS resin can be used continuously especially under a high temperature environment of 170° C. to 190° C., one of the applications of the PAS resin is a bag filter of a dust collector in which fibers of the PAS resin are used. Since the temperature of the exhaust gas that comes into contact with a bag filter may become a high temperature as high as 140° C. to 250° C., the filter material of a bag filter is required to have heat resistance. Moreover, since exhaust gas may contain acidic gas or moisture, the filter material of a bag filter is also required to have acid resistance and resistance to hydrolysis. The PAS resin has been increasing in use as a high performance fiber suitable for this application. Moreover, it is necessary to prolong the life in use of a bag filter and maintain high capture efficiency by, for example, removing soot and dust attached to the bag filter by the use of mechanical vibration or back gas flow, it has been demanded to stably provide a PAS fiber superior in spinnability.

Heretofore, only PAS resins with a low molecular weight (having a melt viscosity of about 10 Pa·s or less) have been able to be produced by ordinary polymerization methods as PAS resins for forming PAS fibers, there has been used a method in which heat treatment is performed in the presence of oxygen, thereby achieving a melt viscosity needed as a crosslinked type PAS resin or a method in which molecular weight is increased by causing a crosslinking agent to exist during polymerization. Such PAS resins with increased molecular weight are inferior in extrusion processability due to their high degree of crosslinking or branching and it is difficult to form fibers or the like therefrom. A straight-chain PAS resin with high molecular weight has been developed by the use of a polymerization aid or a phase separation agent and PAS fibers made of straight-chain PAS resins are known.

In such straight-chain PAS resins, mechanical properties such as heat resistance and strength and moldability such as spinnability are in an opposite relation. For example, Japanese Patent Application Laid-Open (JP-A) No. 63-315655 (Patent Literature 1) has disclosed a melt-blown non-woven fabric made of a straight-chain PPS having a weight average molecular weight of 20000 to 70000 in order to eliminate drawbacks of a conventional thermally-crosslinked PAS resin or a PAS resin obtained by performing polymerization in the presence of a crosslinking agent. If the weight average molecular weight exceeds 70000, then spinning conditions including a temperature considerably higher than the melting point are required, resulting in the occurrence of decomposition or gelation of a polymer and consequently lacking in spinning stability due to clogging of a nozzle. Conversely, if the weight average molecular weight is less than 20000, then the melt viscosity becomes extremely low only by using a spinning temperature slightly higher than the melting point, and therefore the range of controlling spinning conditions is narrow and also the strength of a non-woven fabric was low.

As a PAS resin, one having been three-dimensionally crosslinked by copolymerizing a polyhaloaromatic compound such as trichlorobenzene has been known. For example, Japanese Patent No. 2514832 specification (Patent Literature 2; equivalent to U.S. Pat. Nos. 5,200,500 and 5,268,451, and EP 0344977 A2) has disclosed a PAS crosslinked polymer in which a polyhaloaromatic compound has been made react. This crosslinked PAS resin can be used as a polymer modifier, such as a flashing inhibitor in injection molding, a weld strength improver, and a crystallinity improver in injection molding, by being added to a PAS resin composition, it has been reported to appear approximately gel-like in a molten state and therefore it has not been able to be melt-molded or spun alone. WO 2006/068159 A1 (Patent Literature 3; equivalent to EP 1837359 A1) has disclosed to obtain a branched PAS resin having a melt viscosity, measured at a temperature of 330° C. and a shear rate of 2 $sec^{-1}$, of $10.0 \times 10^4$ to $40.0 \times 10^4$ Pa·s and a melt viscoelasticity tanδ, measured at a temperature of 310° C. and an angular velocity of 1 rad/sec, of 0.10 to 0.30 by adding a polyhaloaromatic compound and a phase separation agent to a polymerization reaction mixture at the time when the conversion of a dihaloaromatic compound has become 80% or more. This branched PAS resin can inhibit the occurrence of flashing remarkably and can afford a molded article superior in surface property when being blended as a polymer modifier into a thermoplastic resin such as a straight-chain poly(arylene sulfide) resin, but it is extremely high in melt viscosity and therefore it has not been able to be melt-molded or spun alone.

JP-A No. 2009-270230 (Patent Literature 4) has disclosed a method for producing a PAS fiber in which in performing the melt extrusion of a PAS resin, a measured value of the activation energy of the viscosity of a melt is fed back within an extruder to the rotation speed of the screw of the extruder, thereby adjusting the activation energy; however, this method requires an extremely complicated control and therefore has problems with operativity or productivity. JP-A No. 2009-270219 (Patent Literature 5) has disclosed a PAS fiber having a total value of peak areas, measured by HPLC (High Performance Liquid Chromatography) analysis, of less than $1.4 \times 10^6$, which is an index of the amount of low molecular weight matters contained in a polymer; however, a complicated process management has been required, for example, the provision of a vent in a melt-extrusion step.

As described above, the conventional straight-chain PAS resin, branched PAS resin, and crosslinked PAS resin are all difficult to be spun to form a fiber or be melt-molded into a film or the like alone.

CITATION LIST

Patent Literatures

Patent Literature 1: JP-A No. 63-315655
Patent Literature 2: Japanese Patent No. 2514832
Patent Literature 3: WO 2006/068159 A1
Patent Literature 4: JP-A No. 2009-270230
Patent Literature 5: JP-A No. 2009-270219

SUMMARY OF INVENTION

Technical Problem

The object of the present invention is to provide a PAS resin that can be subjected to stable molding at the time of the molding of a product involving extrusion and stretching, such as spinning and film formation, without impairing functional balance among heat resistance, chemical resistance, flame retardancy, mechanical strength, electric characteristics, and dimensional stability each inherently possessed by PAS resins and that is superior in workability, and also to provide a method for the production thereof. The problem to be solved by the present invention is to provide a PAS resin that can be melt-molded without occurrence of pollution at a resin ejection hole of a nozzle or the like or can be spun at a high speed without occurrence of filament breakage, a method for the production of the PAS resin, and also a PAS melt-molded article and a PAS fiber.

Solution to Problem

The present inventors earnestly studied the problem toward precisely controlling the branched structure of a PAS molecule by using a polyhaloaromatic compound and, as a result, they thought of a branched PAS resin having specific melt viscosity characteristics and high degree of whiteness. Moreover, the present inventors has thought of producing the branched PAS resin by causing a sulfur source and a dihaloaromatic compound to undergo a polymerization reaction in the presence of a specific amount of a polyhaloaromatic compound at a temperature of 170 to 290° C. in an organic amide solvent. Furthermore, the present inventors have thought of a melt molded article and a fiber made of the branched PAS resin. "Branched" means not only having a molecular structure different from conventional "straight-chain type" or "crosslinked type", but also a branched structure that fails to have high melt-viscosity and can be melt-molded or spun alone like conventional "branched" PAS resins.

Thus, according to the present invention, provided is a branched PAS resin having the following characteristics (a) to (c):

(a) the melt viscosity measured at a temperature of 310° C. and a shear rate of 1200 sec$^{-1}$ is 65 to 450 Pa·s;
(b) the maximum draft ratio measured at a temperature of 310° C. and a discharge rate of 0.05 m/min is 6500 or more; and
(c) the degree of whiteness is 65 or more.

Further, according to the present invention, provided is the branched PAS resin further having characteristic (d):

(d) the dependence of melt viscosity on shear rate, which is the ratio of a melt viscosity measured at a temperature of 310° C. and a shear rate of 200 sec$^{-1}$ to a melt viscosity measured at a temperature of 310° C. and a shear rate of 1200 sec$^{-1}$, is from 1.4 to 2.6.

Further, according to the present invention, provided is the branched PAS resin further having characteristic (e):

(e) the melt stability, which is the ratio of a melt viscosity after retention at a temperature of 310° C. and a shear rate of 1200 sec$^{-1}$ for 30 minutes to a melt viscosity after retention at a temperature of 310° C. and a shear rate of 1200 sec$^{-1}$ for 5 minutes, is from 0.85 to 1.30.

Further, according to the present invention, provided is a method for producing the branched poly(arylene sulfide) resin, wherein the method includes causing a sulfur source and a dihaloaromatic compound to undergo a polymerization reaction at a temperature of 170 to 290° C. in an organic amide solvent in the presence of a polyhaloaromatic compound having three or more halogen substituents in 0.0001 to 0.01 mol of molecules thereof per mol of the fed sulfur source.

Further, according to the present invention, provided is the method for producing the branched PAS resin, wherein the polymerization reaction is one in which the sulfur source, the dihaloaromatic compound, and the polyhaloaromatic compound in an amount of 0.0001 to 0.01 mol per mol of the fed sulfur source are caused to undergo a polymerization reaction at a temperature of 170 to 290° C. in the organic amide solvent.

According to the present invention, provided is the method for producing the branched PAS resin, wherein the polymerization reaction is one in which the sulfur source and the dihaloaromatic compound are caused to undergo a polymerization reaction at a temperature of 170 to 270° C. in the organic amide solvent, then at a time when the conversion of the dihaloaromatic compound has become 30% or more, preferably 80% or more, the polyhaloaromatic compound in an amount of 0.0001 to 0.01 mol per mol of the fed sulfur source is added to a polymerization reaction mixture, at the same time or thereafter a phase separation agent is added, subsequently the temperature of the polymerization reaction mixture is raised, and then the polymerization reaction is continued at a temperature of 240 to 290° C.

According to the present invention, provided is the method for producing the branched PAS resin wherein the method includes the following steps 1 to 4:

(1) dehydration step 1 of heating a mixture containing an organic amide solvent, a sulfur source containing an alkali metal hydrosulfide, and an alkali metal hydroxide, thereby removing at least part of a distillate containing moisture from a system containing the mixture to the outside of the system;

(2) feeding step 2 of mixing the mixture remaining in the system in the dehydration step with a dihaloaromatic compound, thereby preparing a fed mixture containing an organic amide solvent, a sulfur source, an alkali metal hydroxide, moisture, and a dihaloaromatic compound;

(3) earlier polymerization step 3 of heating the fed mixture to a temperature of 170 to 270° C., thereby causing the sulfur source and the dihaloaromatic compound to undergo a polymerization reaction in the organic amide solvent containing the moisture, and at a time when the conversion of the dihaloaromatic compound has become 30% or more, preferably 80% or more, adding a polyhaloaromatic compound in an amount of 0.0001 to 0.01 mol per mol of the fed sulfur source to a polymerization reaction mixture, and at the same time or thereafter, a phase separation agent is added; and (4) later polymerization step 4 of continuing the polymerization reaction at a temperature of 240 to 290° C.

According to the present invention, provided is the method for producing the branched PAS resin, wherein in the dehydration step 1, dehydration is carried out until the amount of moisture becomes 0.01 to 2 mol per mol of the sulfur source (the fed sulfur source) remaining in the system after the dehydration step.

According to the present invention, provided is the method for producing the branched PAS resin, wherein in the feeding step 2, the fed mixture containing components is prepared so that the proportions of the respective components per mol of the fed sulfur source will become 0.95 to 1.09 mol for the alkali metal hydroxide, 0.01 to 2 mol for the moisture, and 0.950 to 1.200 mol for the dihaloaromatic compound.

According to the present invention, provided is the method for producing the branched PAS resin, wherein in the earlier polymerization step 3, the polyhaloaromatic compound and the phase separation agent are added to the polymerization reaction mixture when the conversion of the dihaloaromatic compound has become 30 to 98%, preferably 30 to 95%, more preferably 80 to 95%.

According to the present invention, provided is the method for producing the branched PAS resin, wherein in the earlier polymerization step 3, the addition of the phase separation agent is carried out after a time when the polyhaloaromatic compound was added and by a time when the conversion of the dihaloaromatic compound becomes 95%.

According to the present invention, provided is the method for producing the branched PAS resin, wherein in the earlier polymerization step 3, water is added as the phase separation agent into the polymerization reaction mixture at a time when the conversion of the dihaloaromatic compound has become 30% or more so that the amount of moisture contained in the polymerization reaction mixture will become more than 2 mol but not more than 10 mol per mol of the fed sulfur source.

According to the present invention, provided is the method for producing the branched PAS resin, wherein the polymerization reaction is carried out with the addition of a polymerization aid, for example, water and a metal salt of an organic carboxylic acid.

Further, according to the present invention, provided is the method for producing the branched PAS resin, wherein the method is provided with more than one washing step of washing the poly(arylene sulfide) resin produced by a polymerization reaction with a hydrophilic organic solvent containing water in a proportion of 1 to 30% by mass.

Furthermore, according to the present invention, a melt molding article and a fiber made of the branched PAS resin, and a filter cloth including the fiber are provided.

Advantageous Effects of Invention

Since the branched PAS resin and the method for producing a branched PAS resin of the present invention can provide a PAS resin that can be subjected to stable molding at the time of the molding of a product involving extrusion and stretching, such as spinning and film formation, without impairing functional balance among heat resistance, chemical resistance, flame retardancy, mechanical strength, electric characteristics, and dimensional stability and that is superior in workability, it can be used widely for applications of a PAS resin alone conventionally known for PAS resins and for a variety of applications in which the resin is used in combination with other fibers or other materials. Especially, the branched PAS resin of the present invention is useful for various fiber product applications, e.g., a filter cloth for bag filters because it can be spun at a high speed without occurrence of filament breakage without causing pollution at a resin ejection hole of a nozzle or the like.

DESCRIPTION OF EMBODIMENTS

1. Sulfur Source:

In the present invention, an alkali metal sulfide, an alkali metal hydrosulfide, or a mixture thereof is used as a sulfur source. Hydrogen sulfide can also be used as such a sulfur source.

As a sulfur source, an alkali metal hydrosulfide or a sulfur source containing an alkali metal hydrosulfide as a main component is preferred. Examples of the alkali metal hydrosulfide include, but are not limited to, lithium hydrosulfide, sodium hydrosulfide, potassium hydrosulfide, rubidium hydrosulfide, cesium hydrosulfide, and mixtures of two or more of these. As to the alkali metal hydrosulfide, any of the anhydride, the hydrate, and the aqueous solution thereof may be used. Among these, sodium hydrosulfide and lithium hydrosulfide are preferred because they are industrially available at a low cost.

In the event that the sulfur source is a mixture of an alkali metal hydrosulfide and an alkali metal sulfide, the total molar amount of the alkali metal hydrosulfide and the alkali metal sulfide is the molar amount of the sulfur source to be subjected to a polymerization reaction (sometimes called "fed sulfur source" or "effective sulfur source"). The total molar amount is the molar amount of the fed sulfur source after a dehydration step in the case that the dehydration step is arranged in advance of the feeding step.

Examples of the alkali metal sulfide include, but are not limited to, lithium sulfide, sodium sulfide, potassium sulfide, rubidium sulfide, cesium sulfide, and mixtures of two or more of these. As to the alkali metal sulfide, any of the anhydride, the hydrate, and the aqueous solution thereof may be used. Among these, sodium sulfide is preferred from the viewpoints of being industrially available at low cost and being easy to handle.

2. Alkali Metal Hydroxide:

In the production method of the present invention, it is preferable to adopt a method that includes causing a sulfur source containing an alkali metal hydrosulfide and a dihaloaromatic compound to polymerize in the presence of an alkali metal hydroxide in an organic amide solvent containing moisture.

Examples of the alkali metal hydroxide include, but are not limited to, lithium hydroxide, sodium hydroxide, potassium hydroxide, rubidium hydroxide, cesium hydroxide, and mixtures of two or more of these. Among these, sodium hydroxide is preferred from the viewpoint of being industrially available at low cost.

3. Dihaloaromatic Compound:

The dihaloaromatic compound to be used in the present invention is a dihalogenated aromatic compound that has two halogen atoms directly attached to an aromatic ring. Specific examples of the dihaloaromatic compound include o-dihalobenzenes, m-dihalobenzenes, p-dihalobenzenes, dihalotoluenes, dihalonaphthalenes, methoxy-dihalobenzenes, dihalobiphenyls, dihalobenzoic acids, dihalodiphenyl ethers, dihalodiphenylsulfones, dihalodiphenyl sulfoxides, and dihalodiphenyl ketones. These dihaloaromatic compounds may be used solely or two or more of them may be used in combination.

Here, halogen atoms indicate atoms of fluorine, chlorine, bromine, and iodine; in one dihaloaromatic compound, two halogen atoms may be either the same or different. In many cases, o-dichlorobenzene, m-dichlorobenzene, p-dichlorobenzene, or a mixture of two or more of these is used as the dihaloaromatic compound, and especially p-dichlorobenzene is preferred.

4. Polyhaloaromatic Compound:

In the present invention, in order to introduce a branched structure into a PAS resin, a polyhaloaromatic compound having, in the molecule thereof, three or more halogen substituents (hereinafter sometimes simply called "polyhaloaromatic compound") is used. Halogen substituents are usually substituents in which a halogen atom is directly attached to an aromatic ring. Here, halogen atoms indicate atoms of fluorine, chlorine, bromine, and iodine; in one polyhaloaromatic compound, two or more halogen atoms may be either the same or different.

Examples of the polyhaloaromatic compound include 1,2,3-trichlorobenzene, 1,2,4-trichlorobenzene, 1,3,5-trichlorobenzene, hexachlorobenzene, 1,2,3,4-tetrachlorobenzene, 1,2,4,5-tetrachlorobenzene, 1,3,5-trichloro-2,4,6-trimethylbenzene, 2,4,6-trichlorotoluene, 1,2,3-trichloronaphthalene, 1,2,4-trichloronaphthalene, 1,2,3,4-tetrachloronaphthalene, 2,2',4,4'-tetrachlorobiphenyl, 2,2',4,4'-tetrachlorobenzophenone, and 2,4,2'-trichlorobenzophenone.

These polyhaloaromatic compounds may be used solely or two or more of them may be used in combination. Among such polyhaloaromatic compounds, trihalobenzenes are preferred, and trichlorobenzenes such as 1,2,4-trichlorobenzene and 1,3,5-trichlorobenzene are more preferred.

In order to introduce a branched structure, it is also possible to use, for example, a small amount of an active hydrogen-containing halogenated aromatic compound or a halogenated aromatic nitro compound in combination.

5. Molecular Weight Regulator:

In order to form a terminal of a specific structure in a formed PAS resin or to control a polymerization reaction and a molecular weight, a monohalo compound may be used together. As to such a monohalo compound, not only monohaloaromatic compounds but also monohaloaliphatic compounds can be used.

6. Organic Amide Solvent:

In the present invention, an organic amide solvent, which is an aprotic polar organic solvent, is used as a solvent for a dehydration reaction and a polymerization reaction. The organic amide solvent is preferably one that is stable to alkalies at high temperatures.

Specific examples of the organic amide solvent include amide compounds, such as N,N-dimethylformamide and N,N-dimethylacetamide; N-alkylcaprolactam compounds, such as N-methyl-ε-caprolactam; N-alkylpyrrolidone compounds, such as N-methyl-2-pyrrolidone; N-cycloalkyl pyrrolidone compounds, such as N-cyclohexyl-2-pyrrolidone; N,N-dialkylimidazolidinone compounds, such as 1,3-dialkyl-2-imidazolidinone; tetraalkylurea compounds, such as tetramethylurea; and hexaalkylphosphoric triamide compounds, such as hexamethylphosphoric triamide. These organic amide solvents may be used solely, or two or more of them may be used in combination.

Among these organic amide solvents, N-alkylpyrrolidone compounds, N-cycloalkylpyrrolidone compounds, N-alkylcaprolactam compounds, and N,N-dialkylimidazolidinone compounds are preferred, N-methyl-2-pyrrolidone (NMP), N-methyl-ε-caprolactam, and 1,3-dialkyl-2-imidazolidinone are more preferred, and NMP is particularly preferred.

7. Polymerization Aid:

In the present invention, in order to promote a polymerization reaction, various types of polymerization aids may be used according to need. Specific examples of polymerization aid include metal salts of organic sulfonic acids, lithium halides, water, metal salts of organic carboxylic acids, and alkali metal phosphates which are generally known as polymerization aids of PAS resin, and these may be used alone or in the form of a mixture. Examples of such metal salts of organic carboxylic acids include alkali metal carboxylates, such as lithium acetate, sodium acetate, potassium acetate, sodium propionate, lithium valerate, lithium benzoate, sodium benzoate, sodium phenylacetate, potassium p-toluate, and mixtures thereof. Among such alkali metal carboxylates, sodium acetate is particularly preferably used because it is inexpensive and readily available. The amount of the polymerization aid used, which may vary depending upon the type of the compound to be used, is generally within the range of 0.01 to 10 mol, preferably 0.1 to 2 mol, more preferably 0.2 to 1.8 mol, and particularly preferably within the range of 0.3 to 1.7 mol per mol of the fed sulfur source. In the case that the polymerization aid is a metal salt of an organic sulfonic acid, a lithium halide or a metal salt of an organic carboxylic acid, the upper limit of the amount used is preferably not more than 1 mol, particularly preferably not more than 0.8 mol. The polymerization aid may be added at any time. That is, it may be added during a dehydration step, a feeding step, or a polymerization step, each described below, or before them.

8. Phase Separation Agent:

Although the use of a phase separation agent is not essential in the present invention, in order to obtain a branched PAS resin that is superior in such characteristics as heat resistance and mechanical strength and also superior in moldability such as spinnability, it is preferred to use a phase separation agent. As such a phase separation agent, substances which are known in the art to function as a phase separation agent, such as alkali metal carboxylates, e.g., sodium acetate, lithium acetate, lithium propionate, and lithium benzoate, and water can be used. While alkali metal carboxylates are included in the metal salts of organic carboxylic acids and are used also as a polymerization aid, they are used here in such an amount that they can function as a phase separation agent in the latter polymerization step described in detail below. Out of such phase separation agents, water or a combination of water and sodium acetate, which is inexpensive and the post treatment of which is easy, is preferred. The amount of the phase separation agent used is usually within the range of 0.01 to 10 mol per mol of the fed sulfur source. Although the phase separation agent may partially have been present together since the time of feeding for polymerization, it is desirable to adjust to an amount much enough for forming phase separation by adding the phase separation agent in the course of the polymerization reaction.

9. Method for Producing Branched PAS Resin:

The method of the present invention for producing a branched PAS resin is a method for producing a branched PAS resin including polymerizing a sulfur source and a dihaloaromatic compound in the presence of a polyhaloaromatic compound having, in the molecule thereof, three or more halogen substituents in an organic amide solvent.

Specifically, in the method of the present invention for producing a branched PAS resin, a sulfur source and a dihaloaromatic compound are caused to undergo a polymerization reaction in an organic amide solvent at a temperature of 170 to 290° C. in the presence of a polyhaloaromatic compound having, in the molecule thereof, three or more halogen substituents, in an amount of 0.0001 to 0.01 mol, preferably 0.0005 to 0.008 mol, more preferably 0.0007 to 0.006 mol, particularly preferably 0.001 to 0.005 mol per mol of the fed sulfur source.

In one preferred embodiment, in the method of the present invention for producing a branched PAS resin, the sulfur source, the dihaloaromatic compound and a polyhaloaromatic compound in an amount of 0.0001 to 0.01 mol, preferably 0.0005 to 0.008 mol, more preferably 0.0007 to 0.006 mol, particularly preferably 0.001 to 0.005 mol per mol of the fed sulfur source are caused to undergo a polymerization reaction in the organic amide solvent at a temperature of 170 to 290° C.

In another preferred embodiment, in the method of the present invention for producing a branched PAS resin, the sulfur source and the dihaloaromatic compound are caused to undergo a polymerization reaction in the organic amide solvent at a temperature of 170 to 270° C., and at a time when the conversion of the dihaloaromatic compound has become 30% or more, a polyhaloaromatic compound in an amount of 0.0001 to 0.01 mol per mol of the fed sulfur source is added to a polymerization reaction mixture, and at the same time or thereafter, in other words, with or without taking a reaction time, a phase separation agent is added. Subsequently, the polymerization reaction mixture is heated to a temperature of not lower than 240° C. and a polymerization reaction is continued at a temperature of 240 to 290° C.

More preferably, in the method of the present invention for producing a branched PAS resin, the sulfur source and the dihaloaromatic compound are caused to undergo a polymerization reaction in the organic amide solvent at a temperature of 170 to 270° C., and at a time when the conversion of the dihaloaromatic compound has become 30% or more, a polyhaloaromatic compound in an amount of 0.0001 to 0.01 mol per mol of the fed sulfur source is added to a polymerization reaction mixture, and at the same time or thereafter, a phase separation agent is added (former polymerization step). Subsequently, the polymerization reaction mixture is heated to a temperature of not lower than 240° C., and the polymerization reaction mixture is heated to a temperature of 240 to 290° C. and the polymerization reaction is continued (latter polymerization step).

It is preferable to arrange a dehydration step and a feeding step before performing the former polymerization step and thereby accurately adjust the proportions of the respective components contained. As the sulfur source, the use of a sulfur source containing an alkali metal hydrosulfide is preferred. It is preferred to make an alkali metal hydroxide exist in a polymerization reaction system together with the sulfur source.

Thus, a preferred method of the present invention for producing a branched PAS resin is a method for producing a branched poly(arylene sulfide) resin, in which method a sulfur source and a dihaloaromatic compound are polymerized in an organic amide solvent in the presence of a polyhaloaromatic compound having, in the molecule thereof, three or more halogen substituents, the method including the following steps 1 through 4:

(1) dehydration step 1 of heating a mixture containing an organic amide solvent, a sulfur source containing an alkali metal hydrosulfide, and an alkali metal hydroxide, thereby removing at least part of a distillate containing moisture from a system containing the mixture to the outside of the system;

(2) feeding step 2 of mixing the mixture remaining in the system in the dehydration step with a dihaloaromatic compound, thereby preparing a fed mixture containing an organic amide solvent, a sulfur source (a fed sulfur source), an alkali metal hydroxide, moisture, and a dihaloaromatic compound;

(3) earlier polymerization step 3 of heating the fed mixture to a temperature of 170 to 270° C., thereby causing the sulfur source and the dihaloaromatic compound to undergo a polymerization reaction in the organic amide solvent containing the moisture, and at a time when the conversion of the dihaloaromatic compound has become 30% or more, adding a polyhaloaromatic compound in an amount of 0.0001 to 0.01 mol per mol of the fed sulfur source to a polymerization reaction mixture, and at the same time or thereafter, a phase separation agent is added; and (4) later polymerization step 4 of continuing the polymerization reaction at a temperature of 240 to 290° C.

In methods for the production of PAS resins, alkali metal sulfides have heretofore been used widely as a sulfur source. On the other hand, there has been known a method in which an alkali metal hydrosulfide or a mixture of an alkali metal hydrosulfide and an alkali metal sulfide is used instead of an alkali metal sulfide as a raw material of a sulfur source and it is caused to undergo a polymerization reaction together with a dihaloaromatic compound in the presence of an alkali metal hydroxide. In this method, in order to perform the polymerization reaction stably, it is desirable to accurately adjust the contents of the individual components to be subjected to the polymerization reaction and strictly control polymerization conditions. Then, a preferred production method of the present invention is described in more detail below.

9.1. Dehydration Step:

Sulfur sources often contain moisture such as hydration water (crystal water). When a sulfur source and an alkali metal hydroxide are used in the form of an aqueous mixture, water is contained as a medium. The polymerization reaction of a sulfur source and a dihaloaromatic compound is influenced by the amount of moisture existing in the polymerization reaction system. Therefore, generally, a dehydration step is arranged before the polymerization step and the amount of moisture in a polymerization reaction system is adjusted.

In a preferred production method of the present invention, in the dehydration step, a mixture containing an organic amide solvent, a sulfur source containing an alkali metal hydrosulfide, and an alkali metal hydroxide is heated, whereby at least part of a distillate containing moisture is removed from a system containing the mixture to the outside of the system. The dehydration step is preferably carried out under an inert gas atmosphere.

The dehydration step is carried out within a reaction vessel and the discharge of the distillate to the outside of the system is carried out generally by discharge to the outside of the reaction vessel. The moisture that should be removed by the dehydration step includes hydration water which each raw material fed in the dehydration step contains, the water medium of an aqueous mixture, and water that is by-produced by a reaction between the raw materials.

The addition of each raw material into the reaction vessel is carried out usually within the temperature range of from 20° C. to 300° C., preferably from 20° C. to 200° C. The addition of the raw materials may be done in any order and the raw materials may be additionally added during the dehydration operation. In the dehydration step, an organic amide solvent is used as a medium. The organic amide solvent to be used in the dehydration step is preferably one the same as the organic amide solvent to be used in the polymerization step, and NMP is more preferred because this is readily, industrially available. The amount of the organic amide solvent used is usually about 0.1 to about 10 kg per mol of the sulfur source to be fed into the reaction vessel.

The dehydration operation is carried out by a method in which raw materials are fed into a reaction vessel and then a mixture containing the components is heated usually within a temperature range of up to 300° C., preferably 100 to 250° C., usually for 15 minutes to 24 hours, preferably for 30 minutes to 10 hours.

In the dehydration step, water and an organic amide solvent are distilled off in the form of vapor by heating. Therefore, the water and the organic amide solvent are contained in the distillate. In order to suppress the exhaustion of the organic amide solvent out of the system, part of the distillate may be circulated in the system, but at least part of the distillate containing water is removed to the outside of the system to adjust the amount of moisture. When the distillate is removed to the outside of the system, a slight amount of the organic amide solvent is removed to the outside of the system in association with water.

In the dehydration step, hydrogen sulfide derived from the sulfur source vaporizes. By the hydrogen sulfide that vaporizes out of the system during the dehydration step, the amount of the sulfur source in the mixture remaining in the system after the dehydration step becomes smaller than the amount of the sulfur source supplied. If the sulfur source containing an alkali metal hydrosulfide as a main component is used, the amount of the sulfur source in the mixture remaining in the system after the dehydration step will become substantially equal to the value obtained by subtracting the molar amount of hydrogen sulfide having vaporized out of the system from the molar amount of the sulfur source supplied. In order to distinguish from the sulfur source supplied into the reaction vessel during the dehydration step, the sulfur source in the mixture remaining in the system after the dehydration step is called an "effective sulfur source." The effective sulfur source is a "fed sulfur source" in the feeding step and the subsequent polymerization step. In other words, in the present invention, the "fed sulfur source" means a sulfur source to be subjected to the feeding step and the subsequent polymerization step, and when there is a dehydration step, it means an effective sulfur source that exists in a mixture after the dehydration step.

In the dehydration step, it is preferable to heat a mixture containing an organic amide solvent, a sulfur source containing an alkali metal hydrosulfide, and an alkali metal hydroxide in an amount of 0.900 to 1.050 mol per mol of the sulfur source, thereby removing at least part of the distillate containing water from the system containing the mixture to the outside of the system. If the molar ratio of the alkali metal hydroxide per mol of the sulfur source is excessively small in the dehydration step, the amount of hydrogen sulfide that vaporizes will increase to cause decrease in productivity due to decrease in the amount of the fed sulfur source, or an abnormal reaction or deterioration in quality of a formed PAS resin is readily caused due to the increase of persulfide components in the fed sulfur source remaining after the dehydration. If the molar ratio of the alkali metal hydroxide per mol of the sulfur sources is excessively large, deterioration of the organic amide solvent may increase.

In the dehydration step, moisture, such as hydration water, an aqueous medium, and by-produced water, is removed until the amount thereof falls within the range of a necessary amount. In the dehydration step, it is desirable to perform dehydration until the amount of moisture becomes preferably 0.01 to 2 mol, more preferably 0.2 to 1.9 mol, even more preferably 0.5 to 1.8 mol, particularly preferably 0.8 to 1.7 mol per mol of the effective sulfur source. In the event that the amount of moisture has become excessively small in the dehydration step, it can be adjusted to a desired amount of moisture by adding water in a feeding step.

An alkali metal sulfide generates an alkali metal hydroxide via an equilibrium reaction with water. In a production method using a sulfur source containing an alkali metal hydrosulfide as a main component, the molar ratio of the fed alkali metal hydroxide per mol of the effective sulfur source is calculated in consideration of the amount of the alkali metal sulfide, which is a minor component. If hydrogen sulfide vaporizes out of the system during the dehydration step, since an alkali metal hydroxide is formed in an approximately equimolar amount with the vaporized hydrogen sulfide, a molar ratio of the amount of the fed alkali metal hydroxide per mol of the effective sulfur source is calculated in consideration of the amount of the hydrogen sulfide having vaporized out of the system during the dehydration step.

9.2. Feeding Step:

In the feeding step, the mixture remaining in the system in the dehydration step is mixed with a dihaloaromatic compound, whereby a fed mixture is prepared which contains an organic amide solvent, a sulfur source (a fed sulfur source), an alkali metal hydroxide, moisture, and a dihaloaromatic compound. Generally, since the contents and the amount ratios of the respective components vary during the dehydration step, the adjustment of the amounts of the components during the feeding step must be performed in consideration of the amounts of the components in the mixture obtained by the dehydration step.

In the method of the present invention for producing a branched PAS resin, in the feeding step, the fed mixture containing components is preferably prepared so that the proportions of the respective components per mol of the fed sulfur source will become 0.95 to 1.09 mol for the alkali metal hydroxide, 0.01 to 2 mol for the moisture, and 0.950 to 1.200 mol for the dihaloaromatic compound.

In the present invention, the amount of the fed sulfur source (effective sulfur source) can be calculated by subtracting "the molar amount of the hydrogen sulfide having vaporized in the dehydration step" from "the molar amount of the sulfur source fed in the dehydration step."

Adjustment of the quantitative ratio (molar ratio) of the respective components in the fed mixture is usually performed by the addition of components other than the fed sulfur source into the mixture obtained by the dehydration step. The dihaloaromatic compound is added into a mixture during the feeding step. In the event that the amount of an alkali metal hydroxide or water in the mixture obtained by the dehydration step is small, these components are added during the feeding step. In the event that the amount of the organic amide solvent having been distilled in the dehydration step is excessively large, an organic amide solvent is added during the feeding step. Therefore, in the feeding step, an organic amide solvent, water, and an alkali metal hydroxide may be added in addition to the dihaloaromatic compound according to need.

If hydrogen sulfide vaporizes during the dehydration step, then an alkali metal hydroxide is formed via an equilibrium reaction and this remains in the mixture after the dehydration step. Therefore, it is desirable to grasp such the amounts of the components accurately and thereby determine the molar ratio of the alkali metal hydroxide to the "fed sulfur source" in the feeding step. The number of moles of the alkali metal hydroxide is calculated on the basis of "the number of moles of the alkali metal hydroxide formed in connection with the hydrogen sulfide formed during dehydration", "the number of moles of the alkali metal hydroxide added before dehydration", and "the number of moles of the alkali metal hydroxide added during the feeding step."

If the molar ratio of the alkali metal hydroxide per mol of the fed sulfur source is excessively large, deterioration of the organic amide solvent may be increased or an abnormal reaction during polymerization may be caused. Moreover, decrease in the yield or deterioration in the quality of a branched PAS resin to be formed will be caused more frequently. The molar amount of the alkali metal hydroxide per mol of the fed sulfur source is preferably 0.95 to 1.09 mol, more preferably 0.98 to 1.07 mol, and particularly preferably 1 to 1.065 mol. In the former polymerization step, by adjusting the molar ratio of the alkali metal hydroxide per mol of the fed sulfur source to within the range, it becomes easier to perform a polymerization reaction stably and obtain a high quality branched PAS resin.

In the feeding step, the molar amount of moisture per mol of the fed sulfur source is preferably adjusted so as to fall within the range of 0.01 to 2 mol, more preferably 0.5 to 2 mol, even more preferably 0.7 to 1.8 mol, and particularly preferably 0.9 to 1.6 mol. In the former polymerization step, the reduction of the amount of co-existing moisture needs time for the dehydration step. If the amount of co-existing moisture is excessively large, the polymerization reaction rate becomes remarkably low or a decomposition reaction occurs.

In the feeding step, it is preferable to prepare a fed mixture containing a dihaloaromatic compound preferably in an amount of 0.950 to 1.200 mol, more preferably 0.98 to 1.15 mol, particularly preferably 1 to 1.1 mol per mol of the fed sulfur source. If the ratio of the dihaloaromatic compound used is out of the range, it will become difficult to control the melt viscosity to within a desired range.

In the feeding step, it is preferable to adjust the amount of the organic amide solvent usually to the range of 0.1 to 10 kg, preferably 0.15 to 1 kg per mol of the fed sulfur source. The amount of the organic amide solvent may be changed within the range in the course of the polymerization step.

9.3. Polymerization Step:

In the method of the present invention for producing a branched PAS resin, by heating the fed mixture to a temperature of 170 to 290° C., the sulfur source and the dihaloaromatic compound are caused to undergo a polymerization reaction in the presence of the polyhaloaromatic compound in an amount of 0.0001 to 0.01 mol per mol of the fed sulfur source in the organic amide solvent containing moisture. It is preferred to perform the polymerization reaction by adding a polymerization aid at a proper stage.

In the method of the present invention for producing a branched PAS resin, it is possible to cause the sulfur source, the dihaloaromatic compound, and the polyhaloaromatic compound in an amount of 0.0001 to 0.01 mol per mol of the fed sulfur source to undergo a polymerization reaction at a temperature of 170 to 290° C. in the organic amide solvent containing moisture; in this case, a polymerization aid is added to the fed mixture.

In the method of the present invention for producing a branched PAS resin, it is possible to add a polyhaloaromatic compound in an amount of 0.0001 to 0.01 mol per mol of the fed sulfur source into the polymerization reaction mixture at the time when the conversion of the dihaloaromatic compound has become 30% or more and simultaneously or thereafter add a phase separation agent; in this case, the polymerization reaction may be carried out by adding a polymerization aid at a proper stage.

The polymerization reaction system may be a batch system, a continuous system, or a combination of both systems. In the batch system polymerization, a system in which two or more reaction vessels are used may be used for the purpose of shortening a polymerization cycle time. As a heating method, a method of maintaining a fixed temperature, a method of raising the temperature stepwise or continuously, or a combination of both methods is used. The polymerization temperature can also be lowered in the course of the polymerization reaction.

The polymerization reaction time is generally 10 minutes to 72 hours, preferably 30 minutes to 48 hours. In the present invention, the polymerization step may be carried out by dividing it into a former polymerization step and a latter polymerization step and the polymerization reaction time in such a case is the total time of the former polymerization step and the latter polymerization step. When the polymerization step is carried out by dividing it into a former polymerization step and a latter polymerization step, the polymerization time in the former polymerization step is from for 30 minutes to 5 hours in many cases. The former polymerization step may be composed of a plurality of steps such as varying temperature conditions stepwise or adding water or an alkali metal hydroxide in separated portions.

In the polymerization step, a polymerization reaction is commenced by heating the fed mixture to a temperature of 170 to 290° C., preferably 180 to 280° C., more preferably 190 to 275° C.

When the polymerization step is carried out by dividing it into a former polymerization step and a latter polymerization step, the polymerization reaction is commenced in the former polymerization step by heating the fed mixture to a temperature of 170 to 270° C. A prepolymer with a conversion of the dihaloaromatic compound of 30% or more is formed. If the polymerization temperature is adjusted excessively high in the former polymerization step, then a side reaction or a decomposition reaction easily occurs.

The conversion of the dihaloaromatic compound is preferably 30 to 98%, more preferably 60 to 96%, even more preferably 80 to 95%, and particularly preferably 85 to 95%. The conversion of the dihaloaromatic compound can be obtained by measuring the amount of the dihaloaromatic compound remaining in a reaction mixture by gas chromatography and then calculating the conversion on the basis of the remaining amount, the amount of the dihaloaromatic compound fed, and the amount of the sulfur source fed.

When a dihaloaromatic compound is expressed by "DHA," the conversion can be calculated by the following Formula 1 when the dihaloaromatic compound has been added excessively in molar ratio to a sulfur source:

Conversion=[(the amount of fed DHA (mol))−(the amount of remaining DHA (mol)]/[(the amount of fed DHA (mol)−the amount of excess DHA (mol)]   (Formula 1)

In the other cases, the conversion can be calculated by the following Formula 2:

Conversion=[(the amount of fed DHA (mol))−(the amount of remaining DHA (mol)]/[the amount of fed DHA (mol)]   (Formula 2)

The polymerization reaction may be commenced while a polyhaloaromatic compound is made exist in the reaction system since the initial stage of the former polymerization step or since the stage of the feeding step. However, since polyhaloaromatic compounds are generally more reactive than dihaloaromatic compounds so that a heterogeneous branched structure is introduced in response to the initial stage of polymerization, accordingly a gel-like matter is formed or decrease in maximum draft ratio occurs, so that sufficiently stable moldability, especially spinnability, may not be obtained. For this reason, it is possible to obtain a branched PAS having a desired physical properties (1) by performing a reaction at a relatively low temperature, that is, usually within the temperature range of 150° C. to 230° C., preferably 160° C. to 226° C., particularly preferably 170° C. to 222° C. until the conversion of the dihaloaromatic compound has become 50%, preferably 45%, particularly preferably 40% or (2) by raising the temperature of the polymerization reaction mixture at a temperature increase rate of 1 to 60° C./hour, preferably 2 to 30° C./hour, particularly preferably 3 to 15° C./hour at least in the temperature region between 170° C. and 245° C. Moreover, preferably a polyhaloaromatic compound is added at the time when the conversion of the dihaloaromatic compound has become 30% or more. It is recommended to add the polyhaloaromatic compound more preferably at the time when the conversion of the dihaloaromatic compound has become 50% or more, even more preferably 70% or more, still more preferably 80% or more, particularly preferably 85% or more. On the other hand, even if a polyhaloaromatic compound is added at the time when the conversion of the dihaloaromatic compound has become almost 100%, it is difficult to obtain a desired branched PAS resin because a PAS resin has little room for the introduction of a branched structure. Therefore, the addition of the polyhaloaromatic compound is carried out usually by the time when the conversion of the dihaloaromatic compound has become 98% or less, preferably 97%, more preferably 96%, particularly preferably 95%.

In a preferred production method of the present invention, the sulfur source and the dihaloaromatic compound are caused to undergo a polymerization reaction in the organic amide solvent, and at a time when the conversion of the dihaloaromatic compound has become 30% or more, a polyhaloaromatic compound in an amount of 0.0001 to 0.01 mol per mol of the fed sulfur source and a phase separation agent are added to the polymerization reaction mixture. At the time when the conversion of the dihaloaromatic compound is 30% or more, the weight average molecular weight of the formed polymer (prepolymer) contained in the polymerization reaction mixture is usually 1000 or more, and at the time when the conversion is 80% or more, the weight average molecular weight of the formed polymer (prepolymer) is usually 5000 or more.

The polyhaloaromatic compound is used in a proportion of from 0.0001 to 0.01 mol per mol of the fed sulfur source. If the amount of the polyhaloaromatic compound used is excessively large, the melt viscosity of the branched PAS resin will increase and gel is formed during melt molding, so that stable moldability, especially spinnability, will deteriorate. If the amount of the polyhaloaromatic compound used is excessively small, then the introduction of a branched structure becomes insufficient and there is caused no significant difference from a straight-chain type molecular structure and the range of suitable molding conditions becomes very narrow, so that stable moldability, especially spinnability, will deteriorate. As a result, a product high in maximum draft ratio is no longer obtained.

In the event that the former polymerization temperature is high, it is possible to lower the polymerization temperature in the course of the polymerization reaction, then add a polyhaloaromatic compound when the conversion of the dihaloaromatic compound has become 30% or more, and subsequently raise the temperature up to the latter polymerization temperature. It is preferable to set the temperature of the polymerization reaction mixture at the completion of the former polymerization step to be lower than a prescribed polymerization temperature that is specifically used in the latter polymerization step.

In the event that a phase separation agent is added, the phase separation agent is also added at the time when the conversion of the dihaloaromatic compound is 30% or more.

The phase separation agent may be added substantially simultaneously with the polyhaloaromatic compound or, in order to take a sufficiently long reaction time of the polyhaloaromatic compound, it may be added after the addition of the polyhaloaromatic compound. For example, it is permitted that a polyhaloaromatic compound is added into the polymerization reaction mixture when the conversion of the dihaloaromatic compound has become 30% or more and then a phase separation agent is added when the conversion of the dihaloaromatic compound has become usually 98% or less, preferably 97% or less, more preferably 96% or less, and even more preferably 95% or less.

Although the aforementioned alkali metal carboxylates or water can be used as the phase separation agent, water is used preferably. The use of water is preferred because this is inexpensive and makes post treatment easier. In the case of using water as a phase separation agent, it is preferable to add water in the former polymerization step so that the amount of moisture (total moisture content) in the polymerization reaction mixture may become more than 2 mol but not more than 10 mol per mol of the fed sulfur source at the time when the conversion of the dihaloaromatic compound has become 80% or more. It is desirable to add water as a phase separation agent and thereby adjust the amount of moisture in the polymerization reaction mixture to more preferably 2.3 to 7 mol, even more preferably 2.5 to 5 mol per mol of the fed sulfur source. Combined use of water and an alkali metal carboxylate is also available. In this case, although the amount of the water and the alkali metal carboxylate is just required to be an amount much enough for causing phase separation, it is generally recommended that the amount of the water is adjusted to 0.5 to 10 mol, preferably 0.6 to 7 mol, particularly preferably 0.8 to 5 mol and the amount of the alkali metal carboxylate is adjusted to 0.001 to 0.7 mol, preferably 0.02 to 0.6 mol, particularly preferably 0.05 to 0.5 mol.

In a latter polymerization step described in detail below, by the addition of a phase separation agent, the polymerization reaction is continued usually in a state where the phase has been separated into a polymer thicker phase and a polymer thinner phase. If the amount of the phase separation agent added is excessively small, then it will become difficult to perform phase separation polymerization and it will become difficult to obtain a branched PAS resin with desired properties. If the amount of the phase separation agent added is excessively large, then the polymerization reaction will need a longer time or it will become difficult to form a granular polymer.

9.4. Latter Polymerization Step:

After adding the polyhaloaromatic compound and the phase separation agent in the former polymerization step, the temperature is raised to a temperature of 240° C. or higher, preferably 245° C. or higher.

In the latter polymerization step, in order to continue a polymerization reaction by heating to a temperature of 240 to 290° C., the polymerization reaction mixture after the former polymerization step is heated to a temperature suitable for the latter polymerization step. The upper limit of the heating temperature is the upper limit of the latter polymerization temperature.

In the latter polymerization step, it is usually preferable that the polymerization reaction be continued in a state where the reaction mixture has been phase-separated into a polymer thicker phase and a polymer thinner phase. Generally, since a polymerization reaction is performed under stirring, a phase separation polymerization reaction is in practice carried out in a state where the polymer thicker phase has been dispersed in the form of droplets in the organic amide solvent (the polymer thinner phase). The phase separation state comes to be observed clearly along with the advance of the latter polymerization reaction. The polymerization reaction system may be a batch system, a continuous system, or a combination of both systems. In the batch system polymerization, a system in which two or more reaction vessels are used may be used for the purpose of shortening a polymerization cycle time.

In the latter polymerization step, the polymerization reaction is continued at a temperature of 240 to 290° C., preferably 245 to 280° C., more preferably 250 to 275° C. Although the polymerization temperature may be maintained at a fixed temperature, it may be increased or decreased stepwise according to need.

The polymerization reaction time, expressed by the sum total with the polymerization time in the former polymerization step, is generally 10 minutes to 72 hours, preferably 30 minutes to 48 hours. In many cases, the polymerization time in the latter polymerization step is about 2 hours to about 10 hours. In the event that the conversion of a dihaloaromatic compound has reached 85% or more, preferably 90% or more, more preferably 95% or more and a phase separation agent has been added in the former polymerization, the latter polymerization step may be omitted.

10. Post-Treatment Step:

A post treatment after a polymerization reaction can be performed in accordance with a conventional method. For example, after the completion of the polymerization reaction, if the polymerization reaction mixture is cooled, then a slurry containing the formed polymer is obtained. The cooled slurry is filtered as received or after dilution with water or the like, and repeatedly subjected to washing and filtration, and finally dried, whereby a branched PAS resin can be recovered.

According to the production method of the present invention, since it is possible to form a granular polymer, it is preferable to separate the granular polymer from the slurry by a method that includes sifting the polymer using a screen because the granular polymer can thereby be separated easily from by-products or oligomers. The sifting of the slurry to separate the granular polymer may be carried out in a higher temperature state. In order to form a granular polymer, it is also possible to cause phase separation by the addition of a phase separation agent in the late stage of the polymerization reaction (the latter polymerization) or after the completion of the polymerization reaction, followed by cooling.

After the sifting, it is preferable to wash the polymer with an organic amide solvent that is the same as the polymerization solvent or with a hydrophilic organic solvent such as ketones (e.g., methyl ethyl ketone and acetone) and alcohols (e.g., methanol and isopropanol). Such organic solvents may be aqueous mixtures and preferred are hydrophilic organic solvents containing water in an amount of 1 to 30% by mass, preferably 1 to 20% by mass, particularly preferably 2 to 10% by mass. As such hydrophilic organic solvents, especially organic amide solvents, acetone, methanol, isopropanol are preferred. It is also permitted to wash the polymer with hot water or the like. By such treatment, the generation of volatile matters during melt processing can be reduced and it becomes easier to improve spinnability or achieve a high maximum draft ratio. Moreover, it is also permitted to treat the polymer with an acid or a salt such as ammonium chloride. In the event that the granular polymer formed is excessively large in average particle diameter, a pulverization step may be arranged so that the polymer may have a desired average particle diameter. The granular polymer may also be subjected to pulverization and/or classification.

11. Branched PAS Resin:

According to the production method of the present invention, it is possible to obtain a branched poly(arylene sulfide) resin having the following characteristics (a) to (c) and further characteristics (d) and (e) by, according to need, arranging a step of pulverization of a formed polymer after the polymerization reaction.

[Characteristics]

(a) the melt viscosity measured at a temperature of 310° C. and a shear rate of 1200 $sec^{-1}$ is 65 to 450 Pa·s (hereinafter simply called "melt viscosity"), (b) the maximum draft ratio measured at a temperature of 310° C. and a discharge rate of 0.05 m/min is 6500 or more, (c) the degree of whiteness is 65 or more, (d) the dependence of melt viscosity on shear rate, which is the ratio of a melt viscosity measured at a temperature of 310° C. and a shear rate of 200 $sec^{-1}$ to a melt viscosity measured at a temperature of 310° C. and a shear rate of 1200 $sec^{-1}$, is from 1.4 to 2.6 (hereinafter simply called "dependence of melt viscosity on shear rate"), (e) the melt stability, which is the ratio of a melt viscosity after retention at a temperature of 310° C. and a shear rate of 1200 $sec^{-1}$ for 30 minutes to a melt viscosity after retention at a temperature of 310° C. and a shear rate of 1200 $sec^{-1}$ for 5 minutes (hereinafter simply called "melt stability"), is from 0.85 to 1.30.

The respective characteristics will be described below.

(Melt Viscosity)

The branched PAS resin of the present invention is one that has a melt viscosity measured at a temperature of 310° C. and a shear rate of 1200 $sec^{-1}$ being within the range of 65 to 450 Pa·s. The melt viscosity is preferably within the range of 70 to 300 Pa·s, more preferably 75 to 250 Pa·s, particularly preferably 77 to 200 Pa·s. In the case of using the branched PAS resin of the present invention as a fiber, in order to highly balance physical properties such as heat resistance and strength with moldability such as spinnability, the melt viscosity of the branched PAS resin is preferably brought within the range of 70 to 250 Pa·s, more preferably 75 to 220 Pa·s, particularly preferably 77 to 190 Pa·s. If the melt viscosity of the branched PAS resin is excessively high, then it becomes necessary to fabricate it at higher temperatures, as a result, gel is formed during melt-molding, so that stable moldability, especially spinnability, will deteriorate. If a cross-linked type PAS resin is caused to have a melt viscosity that satisfies the aforementioned range, then crosslinking advances, so that spinnability will deteriorate or the resin will be colored brown. If the melt viscosity of the branched PAS resin is excessively low, then physical properties such as strength and moldability such as spinnability will become poor.

The measurement of melt viscosity is performed by using a capillary-type flow characteristics tester for molten polymer. Specifically, using about 20 g of dry polymer and a slit die of d=10 mm and L=10 mm as a capillary, the polymer is held at a preset temperature of 310° C. for 5 minutes to melt within a barrel and is pressured with a piston, and then the melt viscosity exhibited at a shear rate of 1200 $sec^{-1}$ when the melt is discharged from the capillary is measured.

(Maximum Draft Ratio)

The branched PAS resin of the present invention is one having a maximum draft ratio, measured at a temperature of 310° C. and a discharge rate of 0.05 m/min, within the range of 6500 or more, preferably 6800 or more, more preferably 7000 or more, even more preferably 8000 or more, and particularly preferably 9500 or more. According to the fact that the maximum draft ratio is within the range, superior moldability, especially spinnability, can be obtained and, as a result, molded articles, especially fibers, made of the branched PAS resin become highly balanced between physical properties, such as heat resistance and strength, and moldability. That is, if the maximum draft ratio is excessively small, filament breakage or filament irregularity of fibers occurs, impairing the surface property of the fibers or stable spinning cannot be performed. The maximum draft ratio does not have any particular upper limit, but if it is excessively high, processability may be poor in secondary processing. Therefore, there is a recommendation that the ratio is usually brought into the range of 20000 or less, preferably 18000 or less, and more preferably 15000 or less.

The maximum draft ratio measured at a temperature of 310° C. and a discharge rate of 0.05 m/min is a property measured with a Capillograph 1D manufactured by Toyo Seiki Seisaku-sho Ltd. using about 20 g of dry polymer. A slit die of d=1.0 mm and L=10 mm was used as a capillary, and a dry polymer was filled into a barrel with a barrel diameter of 9.55 mm, melted at 310° C., and discharged at a discharging rate ($V_0$) of 0.05 mm/min by the application of pressure with a piston. Two fulcrum rollers 40 mm in diameter are arranged 46 cm below the die, then a take-up roll is placed and the take-up speed is varied from 5 m/min to 500 m/min over 1 minute, and a ratio of the rate at the time when the discharged material has been broken, $VS_D$, to $V_0$, i.e., $VS_D/V_0$ (maximum draft ratio) is calculated. This operation is repeated for 60 minutes, and an average of five maximum draft ratios taken between the time of 20 minute and the time of 40 minute is calculated and defined as the maximum draft ratio of the sample.

For example, in the case of producing a fiber, if the maximum draft ratio is high, it can be said that there is uniform spinnability such that neither filament breakage nor filament irregularity is caused at a higher speed. Therefore, it can be said that there can be produced in a high productivity a fiber that is uniform in quality and superior in mechanical properties such as tensile strength and knot strength.

(Whiteness)

The branched PAS resin of the present invention is one having a whiteness of 65 or more. The whiteness is preferably within the range of 68 or more, more preferably 70 or more, and particularly preferably 72 or more. If the degree of whiteness of PAS is excessively low, since the color tone of a melt molded article will become brown or color irregularity will occur, resulting in significant inconvenience especially in the case of fiber products. When the degree of whiteness of PAS is high, not only a melt molded article superior in color tone can be obtained but also a melt molded article can be colored into any color easily. Therefore, the upper limit of the degree of whiteness, which is not particularly limited, is usually up to 85. In the case of a conventional thermally crosslinking type PAS resin, it colors remarkable as a result of receiving a heat history.

(Dependence of Melt Viscosity on Shear Rate)

The branched PAS resin of the present invention is preferably one that has a dependence of melt viscosity on shear rate, which is the ratio of a melt viscosity measured at a temperature of 310° C. and a shear rate of 200 $sec^{-1}$ to a melt viscosity measured at a temperature of 310° C. and a shear rate of 1200 $sec^{-1}$, being within the range of from 1.4 to 2.6. The dependence of melt viscosity on shear rate is preferably within the range of from 1.5 to 2.5, more preferably from 1.55 to 2.4, and particularly preferably not less than 1.6 but less than 2.2. If the dependence of melt viscosity on shear rate is excessively low, elasticity will be insufficient at the time of melt-molding, resulting in small die swell and inferior shape retainability. In addition, in the case of forming a fiber, filament breakage readily occurs and it becomes difficult to obtain stable spinnability or a high draft ratio. If the dependence of melt viscosity on shear rate is excessively high, elasticity will become excessively high at the time of melt-molding, resulting in large die swell and reduced dimensional accuracy of molded articles. In addition, in the case of forming a fiber, it becomes difficult to perform uniform spinning and it becomes difficult to obtain stable spinnability or a high draft ratio.

(Melt Stability)

For the branched PAS resin of the present invention, the melt stability, which is the ratio of a melt viscosity after retention at a temperature of 310° C. and a shear rate of 1200 $sec^{-1}$ for 30 minutes to a melt viscosity after retention at a temperature of 310° C. and a shear rate of 1200 $sec^{-1}$ for 5 minutes, is preferably within the range of from 0.85 to 1.30, more preferably from 0.87 to 1.10, and particularly preferably from 0.90 to 1.05. If the melt stability is excessively low or excessively high, since viscosity change of resin occurs in melt-molding, it becomes difficult to perform stable melt molding and in the case of forming a fiber, filament breakage readily occurs and it becomes difficult to obtain stable spinnability and a high draft ratio.

(Melting Point)

The branched PAS resin of the present invention is a resin capable of being melt molded. If the melting point is preferably within the range of 270 to 310° C., more preferably 272 to 300° C., and particularly preferably 273 to 295° C., the resin is suitable for the production of a melt molded article or spinning. The melting point is one measured by raising its temperature up to 340° C. at a rate of 10° C./min using a differential scanning calorimeter (DSC) after holding a sample in a nitrogen atmosphere at 30° C. for 3 minutes.

(Average Particle Diameter)

The branched PAS resin of the present invention preferably has an average particle diameter being within the range of 50 to 2500 μm, more preferably 60 to 2000 μm, and particularly preferably 75 to 1500 μm. In the case of using the branched PAS resin of the present invention as a fiber, in order to obtain stable melt extrudability and spinnability, the average particle diameter of the branched PAS resin is preferably within the range of 100 to 2000 μm, more preferably 120 to 1800 μm, even more preferably 150 to 1700 μm, and particularly preferably 160 to 1500 μm. In order to adjust the average particle diameter of a branched PAS resin, the branched PAS resin obtained by polymerization may be pulverized and/or classified.

If the average particle diameter of a branched PAS resin is excessively small, difficulty will arise in handling, measuring, and the like. If the average particle diameter of a branched PAS resin becomes excessively large, extrudability will be impaired or washing of impurities will become insufficient, so that clogging or pollution of a discharge nozzle will occur and stable moldability, especially, spinnability will become poor.

While the branched PAS resin of the present invention can be fabricated alone into a molded article and also can be fabricated into a sheet or a film, it also can be used as a blend with a substantially linear straight-chain PAS resin. The substantially linear straight-chain PAS resin is a polymer well-known in the art. The straight-chain PAS resin is desirably a straight-chain PPS resin having a melt viscosity measured at a temperature of 310° C. and a shear rate of 1200 $sec^{-1}$ of usually 20 to 450 Pa·s, preferably 65 to 250 Pa·s, more preferably 70 to 220 Pa·s. A resin composition can be formed in which a branched PAS resin has been incorporated in an amount of 50 parts by mass or more, preferably 100 to 1000 parts by mass, more preferably 110 to 500 parts by mass relative to 100 parts by mass of a straight-chain PAS resin. To this resin composition may be added various types of organic or inorganic fillers and various types of additives, such as stabilizers, e.g., antioxidants and heat stabilizers, lubricants, release agents and colorants.

EXAMPLES

The present invention will be described more concretely below by way of examples and comparative examples, but the invention is not limited to the examples. The methods for measuring and calculating physical properties and characteristics are as follows.

(1) Melt Viscosity

Using about 20 g of dry polymer, the melt viscosity was measured with a Capillograph 1D, manufactured by Toyo Seiki Seisaku-sho, Ltd. In this measurement, a slit die of d=10 mm and L=10 mm was used as a capillary, and the preset temperature was 310° C. A polymer sample was introduced to the apparatus and held there for 5 minutes, and then its melt viscosity was measured at a shear rate of 1200 $sec^{-1}$.

(2) Maximum Draft Ratio

The maximum draft ratio was measured with a Capillograph 1D, manufactured by Toyo Seiki Seisaku-sho, Ltd. using about 20 g of dry polymer. In this measurement, a slit die of d=1.0 mm and L=10 mm was used as a capillary, and a dry polymer was filled into a barrel with a barrel diameter of 9.55 mm, melted at 310° C., and discharged at a discharging rate ($V_0$) of 0.05 mm/min Two fulcrum rollers 40 mm in diameter were arranged 46 cm below the die, then a take-up roll was placed and the take-up speed was varied from 5 m/min to 500 m/min over 1 minute, and a ratio of the rate at the time when the discharged material was broken, $VS_D$, to $V_0$, i.e., $VS_D/V_0$ (maximum draft ratio) was calculated. This operation was repeated for 60 minutes, and an average of five maximum draft ratios taken between the time of 20 minute and the time of 40 minute was calculated and defined as the maximum draft ratio of the sample. The upper limit of maximum draft ratio on the apparatus configuration was 10965.

(3) Whiteness

The measurement of the degree of whiteness was carried out as follows. Specifically, a polymer was heated and melted for 10 minutes with a hot press heated to 320° C. and then solidified under pressing at 40° C. for 5 minutes, whereby a sheet was prepared, and then the resulting sheet was annealed at 150° C. for 30 minutes. This sheet was used as a sample and the measurement of color tone was performed by reflectometry with standard light C using "Chroma Meter CR-200" manufactured by Minolta Co., Ltd. In advance of the measurement, calibration was carried out with a standard white plate. Each sample was measured at three points and the average of the measurements was calculated.

(4) Dependence of Melt Viscosity on Shear Rate

The dependence of melt viscosity on shear rate was determined from results obtained by measuring melt viscosities at a shear rate of 1200 $sec^{-1}$ and a shear rate of 200 $sec^{-1}$ using the measuring instrument used for (1) measurement of melt viscosity. Specifically, the ratio of the melt viscosity at a preset temperature of 310° C. and a shear rate of 200 $sec^{-1}$ to the melt viscosity at a preset temperature of 310° C. and a shear rate of 1200 $sec^{-1}$ was calculated.

(5) Melt Stability

The melt stability was determined from results measured using the measuring instrument used for (1) measurement of melt viscosity. A polymer sample was introduced to the apparatus and held there for 5 minutes, and then its melt viscosity was measured at a shear rate of 1200 $sec^{-1}$. Similarly, after holding for 30 minutes, a melt viscosity was measured at a shear rate of 1200 $sec^{-1}$. The ratio of the melt viscosity after holding for 30 minutes to the melt viscosity after holding for 5 minutes was calculated.

(6) Melting Point

Each melting point is one measured as an endothermic peak temperature obtained by holding a sample in a nitrogen atmosphere at 30° C. for 3 minutes and then raising its temperature up to 340° C. at a rate of 10° C./min using a differential scanning calorimeter (DSC).

(7) Average Particle Diameter

In accordance with JIS K-0069, a particle diameter distribution was measured by a sieving method using a sieve having a prescribed opening and then an average particle diameter was calculated. Sieving was carried out by using an electromagnetic sieve shaker (trade name "ANALYSETTE 3") manufactured by FRITSCH CO. under conditions of a shaking time of 15 minutes, an amplitude of 6, and an interval of 6.

(8) Conversion of Dihaloaromatic Compound

The amount of a dihaloaromatic compound remaining in a reaction mixture was determined by gas chromatography, and then the conversion of the dihaloaromatic compound was calculated on the basis of that remaining amount, the amount of the dihaloaromatic compound fed, and the amount of a sulfur source fed.

Example 1

Preparation of Branched PPS-1

A 20-liter autoclave was charged with 6000 g of N-methyl-2-pyrrolidone (NMP), 2000 g of an aqueous solution of sodium hydrosulfide (NaSH; concentration 62% by mass, containing 28 g of $Na_2S$), and 1180 g of sodium hydroxide (NaOH; concentration 74% by mass). The molar ratio of sodium hydroxide/sulfur source (NaOH/S) was 1.019, and the molar ratio of NaOH/NaSH was 1.034.

After having purged the autoclave with nitrogen gas, the temperature was raised slowly up to 200° C. over about 4 hours under stirring at a rotation speed of a stirrer of 250 rpm, whereby 1010 g of water ($H_2O$), 1280 g of NMP, and 12 g of hydrogen sulfide ($H_2S$) were distilled off.

After a dehydration step, the contents of the autoclave were cooled to 170° C., and 3380 g of p-dichlorobenzene (pDCB), 3449 g of NMP, 19.29 g of sodium hydroxide, and 153 g of water were added. The ratio (g/mol) of NMP/fed sulfur source (hereinafter abbreviated as "fed S") in the can was 375, pDCB/fed S (mol/mol) was 1.047, $H_2O$/fed S (mol/mol) was 1.50, and NaOH/fed S (mol/mol) was 1.050.

Under stirring at a rotation speed of a stirrer of 250 rpm, former polymerization was carried out at a temperature of 220° C. After 3 hours following the commencement of the former polymerization, a part of the reaction liquid was sampled and the amount of remaining pDCB was measured, followed by calculation, which revealed that the conversion of pDCB was 90%.

Subsequently, while stirring the contents of the autoclave, 550 g of an NMP solution containing 8 g of 1,2,4-trichlorobenzene (TCB) was forced in, and 15 minutes later (conversion of PDCB was 93%), 500 g of water was also forced in, whereby the former polymerization was ended. The TCB/fed S (mol/mol) was 0.002. Then, the rotation speed of the stirrer was increased to 400 rpm. The $H_2O$/fed S (mol/mol) was 2.63.

After the forcing in of the water, the temperature was raised up to 255° C. and the polymerization reaction was continued for 4 hours while maintaining that temperature, whereby latter polymerization was carried out.

After the completion of the latter polymerization, followed by cooling to near room temperature, the contents of the autoclave were sieved with a screen having an opening of 150 µm to collect granular polymer, which was subjected to washing with aqueous acetone containing 5% by mass of water three times and washing with water five times, whereby a washed granular branched PPS resin (branched PPS-1) was obtained.

This granular PPS was dried at 105° C. for 13 hours. The thus obtained granular branched PPS-1 had an average particle diameter of 480 µm and a melt viscosity of 185 Pa·s. The results of the measurement of dependence of melt viscosity on shear rate, melt stability, degree of whiteness, and maximum draft ratio are shown in Table 1. The melting point was 277° C. and the yield was 93.5%.

Example 2

Preparation of Branched PPS-2

A granular branched polymer was obtained in the same manner as Example 1 except for adding TCB not in the later stage of the former polymerization but in the feeding step together with pDCB and reducing the amount of pDCB so that the pDCB/fed S (mol/mol) might become 1.045 in order to adjust the melt viscosity to that of PPS-1. The thus obtained granular branched PPS-2 had an average particle diameter of 510 µm and a melt viscosity of 177 Pa·s. The results of the measurement of dependence of melt viscosity on shear rate, melt stability, degree of whiteness, and maximum draft ratio are shown in Table 1. The melting point was 279° C. and the yield was 94.0%.

Comparative Example

Preparation of Straight-Chain PPS-L

A granular polymer was obtained in the same manner as Example 1 except for using no TCB and reducing the amount of pDCB so that the pDCB/fed S (mol/mol) might become 1.025 in order to adjust the melt viscosity to those of PPS-1 and PPS-2. The thus obtained straight-chain PPS-L had an average particle diameter of 450 µm and a melt viscosity of 180 Pa·s. The results of the measurement of dependence of melt viscosity on shear rate, melt stability, degree of whiteness, and maximum draft ratio are shown in Table 1. The yield was 87%.

Conversely, when the same spinning was performed for PPS-L of Comparative Example 1, which was a straight-chain PPS, filament breakage occurred in one hour and, also after that, filament breakage occurred frequently. When the spinneret was observed after 72 hours, colored liquid and carbonized resin had adhered thereto.

Industrial Applicability

Since the branched PAS resin and the method for producing a branched PAS resin of the present invention can provide a PAS resin that can be subjected to stable molding at the time of the molding of a product involving extrusion and stretching, such as spinning and film formation, without impairing functional balance among heat resistance, chemical resistance, flame retardancy, mechanical strength, electric characteristics, and dimensional stability and that is superior in workability, it can be used widely for applications of a PAS resin alone conventionally known for PAS resins and for a variety of applications in which the resin is used in combination with other fibers or other materials. Especially, the branched PAS resin of the present invention is useful for various fiber product applications, e.g., a filter cloth for bag filters because it can be spun at a high speed without occurrence of filament breakage without causing pollution at a resin ejection hole of a nozzle or the like.

The invention claimed is:

1. A method for producing a branched poly(arylene sulfide) resin having characteristics (a) to (e) described below, wherein the method comprises causing a sulfur source and a dihaloaromatic compound to undergo a polymerization reaction, and wherein the polymerization reaction is one in which the sulfur source and the dihaloaromatic compound are caused to undergo a polymerization reaction at a temperature of 170 to 270° C. in an organic amide solvent, then at a time when the conversion of the dihaloaromatic compound has become 30% or more, a polyhaloaromatic compound in an amount of 0.0001 to 0.008 mol per mol of the fed sulfur source is added to a polymerization reaction mixture, at the same time or thereafter a phase separating agent is added, subsequently the temperature of the polymerization reaction mixture is raised, and then the polymerization reaction is continued at a temperature of 240 to 290° C.:

TABLE 1

| | | Melt Viscosity (Pa · s) | Maximum Draft Ratio | Degree of Whiteness | Dependence on Shear Rate | Melt Stability | Average Particle Diameter (µm) |
|---|---|---|---|---|---|---|---|
| Ex. 1 | Branched PPS-1 | 185 | 10078 | 74 | 2.14 | 0.95 | 480 |
| Ex. 2 | Branched PPS-2 | 177 | 6948 | 73 | 2.00 | 0.97 | 510 |
| Comp. Ex. | Straight-Chain PPS-L | 180 | 5760 | 74 | 1.40 | 0.82 | 450 |

The branched PPSs of Examples 1 and 2, which were branched PAS resins of the present invention, are superior in spinnability. When an unstretched thread was produced for 72 hours at a spinning rate of 1500 m/min using a melt spinning spinneret with a temperature of 310° C., 36 holes, and a hole diameter of 0.25 mm, a thread was formed successfully without any hindrance.

(a) the melt viscosity measured at a temperature of 310° C. and a shear rate of 1200 sec$^{-1}$ is 65 to 450 Pa·s;

(b) the measured maximum draft ratio, $VS_D/V_0$, is 6500 or more, wherein the maximum draft ratio is measured by melting a dry polymer at 310° C., discharging the melted polymer at a discharging rate ($V_0$) of 0.05 mm/min, and varying a take-up speed from 5 m/min to 500 m/min over 1 minute, and $VS_D$ is a rate at the time when the discharged material is broken;

(c) the degree of whiteness is 65 or more;

(d) the dependence of melt viscosity on shear rate, which is the ratio of a melt viscosity measured at a temperature of 310° C. and a shear rate of 200 sec$^{-1}$ to a melt viscosity measured at a temperature of 310° C. and a shear rate of 1200 sec$^{-1}$ is from 1.4 to 2.6; and (e) the melt stability, which is the ratio of a melt viscosity after retention at a temperature of 310° C. and a shear rate of 1200 sec$^{-1}$ for 30 minutes to a melt viscosity after retention at a temperature of 310° C. and a shear rate of 1200 sec$^{-1}$ for 5 minutes, is from 0.85 to 1.30.

2. The method for producing a branched poly(arylene sulfide) resin according to claim 1, wherein the method comprises the following steps 1 to 4:

(1) dehydration step 1 of heating a mixture containing an organic amide solvent, a sulfur source containing an alkali metal hydrosulfide, and an alkali metal hydroxide, thereby removing at least part of a distillate containing moisture from a system containing the mixture to the outside of the system;

(2) feeding step 2 of mixing the mixture remaining in the system in the dehydration step with a dihaloaromatic compound, thereby preparing a fed mixture containing an organic amide solvent, a sulfur source, an alkali metal hydroxide, moisture, and a dihaloaromatic compound;

(3) earlier polymerization step 3 of heating the fed mixture to a temperature of 170 to 270° C., thereby causing the sulfur source and the dihaloaromatic compound to undergo a polymerization reaction in the organic amide solvent containing the moisture, and at a time when the conversion of the dihaloaromatic compound has become 30% or more, adding a polyhaloaromatic compound in an amount of 0.0001 to 0.008 mol per mol of the fed sulfur source to a polymerization reaction mixture, and at the same time or thereafter, a phase separation agent is added; and (4) later polymerization step 4 of continuing the polymerization reaction at a temperature of 240 to 290° C.

3. The method for producing a branched poly(arylene sulfide) resin according to claim 2, wherein in dehydration step 1, dehydration is carried out until the amount of moisture becomes 0.01 to 2 mol per mol of the fed sulfur source.

4. The method for producing a branched poly(arylene sulfide) resin according to claim 2, wherein in feeding step 2, the fed mixture containing components is prepared so that the proportions of the respective components per mol of the fed sulfur source will become 0.95 to 1.09 mol for the alkali metal hydroxide, 0.01 to 2 mol for the moisture, and 0.950 to 1.200 mol for the dihaloaromatic compound.

5. The method for producing a branched poly(arylene sulfide) resin according to claim 2, wherein in earlier polymerization step 3, the polyhaloaromatic compound and the phase separation agent are added to the polymerization reaction mixture when the conversion of the dihaloaromatic compound has become 30 to 98%.

6. The method for producing a branched poly(arylene sulfide) resin according to claim 5, wherein in earlier polymerization step 3, the addition of the phase separation agent is carried out after a time when the polyhaloaromatic compound was added and by a time when the conversion of the dihaloaromatic compound becomes 95%.

7. The method for producing a branched poly(arylene sulfide) resin according to claim 2, wherein in earlier polymerization step 3, water is added as the phase separation agent into the polymerization reaction mixture at a time when the conversion of the dihaloaromatic compound has become 30% or more so that the amount of moisture contained in the polymerization reaction mixture will become more than 2 moles but not more than 10 mol per mol of the fed sulfur source.

8. The method for producing a branched poly(arylene sulfide) resin according to claim 2, wherein the polyhaloaromatic compound is added to the polymerization reaction mixture at a time when the conversion of the dihaloaromatic compound has become 80% or more.

9. The method for producing a branched poly(arylene sulfide) resin according to claim 1, wherein the polymerization reaction is carried out with further addition of a polymerization aid.

10. The method for producing a branched poly(arylene sulfide) resin according to claim 9, wherein the polymerization aid is water and a metal salt of an organic carboxylic acid.

11. The method for producing a branched poly(arylene sulfide) resin according to claim 1, wherein the method is provided with more than one washing step of washing the poly(arylene sulfide) resin produced by a polymerization reaction with a hydrophilic organic solvent containing water in a proportion of 1 to 30% by mass.

* * * * *